United States Patent [19]

Wheelock

[11] 4,171,289

[45] Oct. 16, 1979

[54] SELECTIVE AUTOMOTIVE EXHAUST CATALYSTS AND A PROCESS FOR THEIR PREPARATION

[75] Inventor: Kenneth S. Wheelock, Baton Rouge, La.

[73] Assignee: Exxon Research & Engineering Co., Florham Park, N.J.

[21] Appl. No.: 856,930

[22] Filed: Dec. 2, 1977

[51] Int. Cl.$^2$ .................. B01J 21/04; B01J 23/42; B01J 23/44; B01J 23/46
[52] U.S. Cl. ........................... 252/466 PT; 252/472; 423/213.5
[58] Field of Search ................ 252/466 PT, 472; 423/213.5

[56] References Cited

U.S. PATENT DOCUMENTS

| | | | |
|---|---|---|---|
| 3,425,792 | 2/1969 | Stephens | 252/466 PT |
| 3,458,276 | 7/1969 | Bloch | 423/213.5 |
| 4,005,177 | 1/1977 | Weidenbach et al. | 252/463 X |
| 4,111,848 | 9/1978 | Torii et al. | 252/466 PT |

Primary Examiner—W. J. Shine

Attorney, Agent, or Firm—L. A. Proctor

[57] ABSTRACT

The disclosure herein relates to (a) a process for the preparation of catalysts which are highly active for oxidizing the carbon monoxide (CO) and hydrocarbon (HC) present in automobile exhaust gases, with minimum oxidation of the sulfur dioxide, by controlling the acidity of the support, or carrier, within certain critical ranges while a Group VIII noble metal component, or components, is composited with said support in forming the catalyst; (b) a process embodying the use of the so-formed catalysts in the treatment of automotive exhaust gases; and, (c) the catalyst compositions so-formed from supports the surface acidity of which is controlled. In the formation of the catalysts the total surface acidity of the support on which the metal, or metals, component is deposited is maintained between about 0.01 to about 0.10 micromoles pyridine/m$^2$, and the surface area of the metal, or metals, component ranges up to about 50 m$^2$/g, preferably from about 1 m$^2$/g to about 35 m$^2$/g, and more preferably from about 1 m$^2$/g to about 20 m$^2$/g.

20 Claims, 1 Drawing Figure

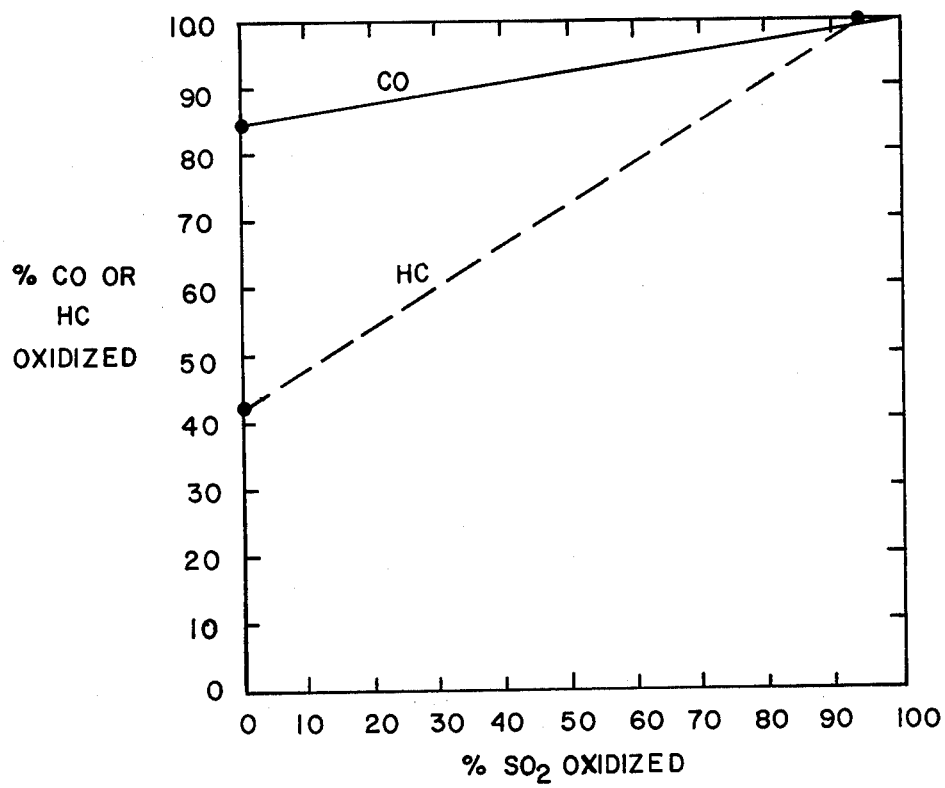
% CO OR % HC OXIDIZED VS. % SO$_2$ OXIDIZED
LEAST SQUARES LINEAR REGRESSION DATA
% HC OXIDIZED = 0.60 (% SO$_2$ OXIDIZED) + 42.5
CORRELATION COEFFICIENT = 0.84192
CONFIDENCE LIMIT AT LEAST 99.9 %
% CO OXIDIZED = 0.15 (% SO$_2$ OXIDIZED) + 86.5
CORRELATION COEFFICIENT = 0.83905
CONFIDENCE LIMIT AT LEAST 99.9 %

SELECTIVE AUTOMOTIVE EXHAUST CATALYSTS AND A PROCESS FOR THEIR PREPARATION

On passage of the Clean Air Act, firstly it was mandated that the EPA Administrator would establish air pollutant emission standards for new motor vehicles if, in his judgment, the public health or welfare were threatened; the development of adequate technology, and its cost, being factors to be weighed by the Administrator in establishing the regulations. Secondly, Congress itself mandated that the EPA regulations applicable to the emission of carbon monoxide (CO) and hydrocarbons (HC) for light duty vehicles, principally passenger cars, manufactured after 1977 require 90 percent reduction from 1970 model year emissions. The widespread use of catalytic converters for emission control thus began in the fall of 1974. The function of the catalyst is to accelerate the rate at which the CO and HC exhaust gases from the engine react with oxygen in air to form environmentally harmless $CO_2$ and water. Catalysts in todays cars can reduce CO and HC gases exhausted from the tail pipe by 50 to 60 percent at the end of 50,000 miles of EPA durability testing, this not only having reduced pollution but also having made possible an average 13.5 percent fuel economy improvement realized by 1975 model automobiles over comparable 1974 models. However, yet higher efficiency after-treatment provided by catalytic technology will be needed to provide the fuel economy the nation is now demanding.

Catalytic converters for the control of automotive emissions to the levels required by Section 202 of the Clean Air Act, as twice amended, in any event, have now been developed to the point that emissions of CO and HC from automobiles sold during the present model year has met the 1977 goal mandated by Congress. Goals requiring the further reduction of these components in exhaust gases have now also been achieved, but the emission standards for CO and HC have now been further extended; not because of any unavailability of the technology required to effect further reductions, but because of an unanticipated side effect of catalytic converters which has significantly increased the emission of sulfuric acid. Despite wide ranges of uncertainty, there is a reasonable consensus that sulfuric acid emissions could pose a risk to public health more hazardous than either the CO or HC emissions sought to be avoided. The EPA Administration, as a consequence, has set a sulfuric acid emission standard and concluded that HC and CO standards should remain at current levels until 1979, this being the first year for application of the sulfuric acid emission standard. It is now a goal for the 1980–81 model years to develop the technology to the point that the emission standard for HC and CO can be further tightened without compromising the sulfuric acid standard.

Typically, the sulfur dioxide concentration in a raw exhaust gas is about 20 parts per million parts by weight (ppm) of exhaust gas, which is environmentally acceptable. However, automobiles equipped with catalytic converters for the purpose of lowering emissions of CO and HC emit sulfate, either as a sulfuric acid aerosol or as particulates caused by sulfuric acid corrosion of the metal portions of the exhaust train. The sulfur in gasoline, typically present in amounts of about 300 ppm, is oxidized to sulfur dioxide in the combustion chamber of the engine. In the absence of a catalytic converter, the sulfur dioxide is exhausted unchanged from the tail pipe of the automobile. Thus, the catalytic converter is responsible for the oxidation of sulfur dioxide in the exhaust gas to produce sulfur trioxide which immediately hydrates due to the presence of water vapor, one of the combustion products, to form a sulfuric acid aerosol or acid particulates, neither of which is environmentally acceptable.

Oxidation catalysts are comprised generally of a base metal or noble metal, particularly the latter, supported on a suitable carrier, e.g., a refractory inorganic oxide, glass or ceramic structure, notably alumina, shaped as beads, pellets, monolith or honeycomb structures which have been developed to a point which when exhaust gas from an engine is contacted therewith, much of the CO and HC is converted to carbon dioxide and water, or other relatively harmless oxidation products. As stated, however, while these catalysts have been proven adequate in reducing CO and HC emissions from internal combustion engines to the extent necessary to more than meet present EPA emission requirements, this has resulted in the co-emission of sulfuric acid. This, in turn has presented a dilemma because more stringent requirements for the further reduction of CO and HC results in increased emissions of this hazardous acid. Hence, there now exists an acute need for improved catalysts which will provide greater selectivity in maximizing the oxidation of CO and HC (and thereby reduce CO and HC emissions) while simultaneously minimizing the oxidation of sulfur dioxide, in the treatment of automotive exhaust gases.

It is, accordingly, the primary objective of the present invention to supply this need.

A specific object is to provide a process wherein the fumes, or gases, from a combusting sulfur containing gasoline are contacted with an improved oxidation catalyst comprised of a noble metal composited with alumina, the surface of which has been treated to increase the selectivity of the catalyst for oxidation of CO and HC, and simultaneously suppress, or inhibit the selectivity of the catalyst for oxidation of sulfur dioxide.

These objects and others are achieved in accordance with the present invention embodying (a) a process for the preparation of catalysts which are highly active for oxidizing the CO and HC present in automobile exhaust gases, with minimum oxidation of the sulfur dioxide, by controlling the acidity of the support, or carrier, within certain ranges while the metal component, or components, is composited with said support as a highly agglomerated metal in forming the catalyst; (b) a process embodying the use of the so-formed catalysts in the treatment of automotive exhaust gases; and, (c) the catalyst compositions so-formed from supports the surface acidity of which is controlled.

It has been discovered that a catalyst which is comprised of a suitable support with which is composited a Group VIII noble metal of the Periodic Table of the Elements (Copyright by Sargent-Welch Scientific Company, 1968), particularly one which includes platinum alone or platinum in admixture with an other Group VIII noble metal, or metals, preferably rhodium, iridium, ruthenium or palladium, to provide a relatively low surface area agglomerate of said metal, or metals, ranging up to about 50 $m^2/g$ (square meters per gram; as measured by chemisorption techniques, *J. of Catalysis*, 8 348, 1967 by D. C. Yates and J. H. Sinfelt), preferably from about 1 $m^2/g$ to about 35 $m^2/g$, more preferably from about 1 m$^2$/g to about 20 m$^2$/g, will provide when contacted with automotive exhaust gases quite high rates of oxidation of CO and HC, and simultaneously a low, or minimal rate of oxidation of sulfur dioxide to sulfur trioxide, as sharply contrasted with the more conventional oxidation catalysts used for the control of CO and HC in automotive emissions, which generally have quite high metal surface areas. The CO and HC oxidation rates, on the one hand, and the SO$_2$ oxidation rate, on the other hand, it has been found, are sharply contrasted with the state of dispersion of a metal component, or components, on the catalyst, the CO and HC oxidation rates being minimized by a relatively highly agglomerated metal, or metals component, and maximized by a highly dispersed form of the metal, or metals component. The SO$_2$ oxidation rate is also minimized by a relatively highly agglomerated metal, or metals component, and maximized by a highly dispersed form of the metal, or metals component. However, though all three of these oxidations reactions are decreased in rate by agglomeration of the metal, or metals component, the SO$_2$ oxidation reaction is suppressed to a greater extent than is the CO and HC oxidation reactions. Hence, control of the crystallite size of the metal, or metals component, as conveniently measured by chemisorption techniques, offers a method of treating automotive exhaust gases to suppress, or minimize, the SO$_2$ oxidation rate while simultaneously promoting, and accelerating the rates of CO and HC oxidation.

The oxidation catalysts of this invention can be prepared by forming the metal, or metals agglomerates on a support, or carrier, while controlling the total surface acidity, to provide the desired metal, or metals surface area. Both the Bronsted and Lewis acid acidity, which determine the total surface acidity of the support, or carrier, can be measured by the chemisorption of various nitrogen heterocyclic compounds and, for purposes of the present invention, is conveniently expressed in terms of micromoles of pyridine absorbed per unit of surface area on the support (BET). In one of its aspects it has been found that catalysts having metal surface areas ranging from about 1 m$^2$/g to about 50 m$^2$/g can be prepared by maintaining the total surface acidity of a support between about 0 and about 0.2 micromoles pyridine/m$^2$, and catalyst with surface areas ranging from about 1 m$^2$/g to about 35 m$^2$/g, or more suitably from about 1 m$^2$/g to about 20 m$^2$/g, by maintaining the total surface acidity of a support between about 0.01 to about 0.10 micromoles pyridine/m$^2$, preferably from about 0.01 to about 0.05 micromoles of pyridine/m$^2$.

In general, any of the support materials known in the prior art can be effectively used in the preparation of oxidation catalysts of this invention. These support materials include the various refractory materials, inorganic metal oxides, glass materials, ceramic materials and the like. These materials can be acidic, basic or neutral prior to treatment in accordance with the present invention to provide the desired surface acidity. Suitable ceramic materials include alumina, cordierite, spondumene and petalite while suitable refractories include silica, alumina, magnesia, zirconia, titania and the like.

Various methods known to be useful in controlling surface acidity can be used to effect the change therein required by the present invention. The total surface acidity, for example, can be adjusted or controlled by coating the support with one or more suitable coating materials, by chemical treatment and/or by heat treatment. In this regard, acidic support materials can be rendered less acidic by coating with either a basic, neutral or weakly acid material, and conversely, basic support materials can be rendered acidic by coating with suitable acidic materials. Similarly, neutral supports could be rendered acidic by coating with a suitable acidic material. The total acidity of acidic support materials can also be adjusted or controlled by caustic treatment while the surface acidity of basic and neutral support materials can be controlled within the desired range by acid treatment. Moreover, the total acidity of acidic support materials can be reduced by various heat treatments, the acidity of which will vary with the particular support material employed, and its source.

In general, when the total surface acidity is controlled by surface coating, essentially any of the techniques known to be useful in the prior art to effect such a coating can be used. When control of the total surface acidity is accomplished by directly coating, the resulting support material generally exhibits a total surface acidity between that of the coating material and that of the material actually coated. Such techniques also include deposition of the desired coating material, materials or precursors thereof on the surface of the base support material followed by drying and/or conversion of the material thus deposited to the desired coating material or materials. However, care should be exercised in the treatment of an acidic support for the purpose of reducing its acidity because often inherent changes produced during post treatments can increase the acidity of the support. In this regard, it should be noted that it is known in the prior art to coat various support materials by first depositing a coating of one or more hydrolizable materials and thereafter hydrolizing the coating material. Such a process, however, increases the total surface acidity and therefore should be avoided when a support material having a total acidity greater than that desired in the present invention is to be treated.

The total surface acidity of all support materials varies over a relatively broad range depending upon the particular materials and the particular source of that material and, for this reason, the exact amount of material to be deposited on the surface of the base or support material to be treated will vary with the particular material and the source of that material. The exact amount required, however, for optimum performance is readily determined on a trial and error basis. A number of techniques for changing the surface acidity of various support materials is disclosed by Kozo Tanube, Solid Acids and Bases, Tokyo, Kadausha, New York, Academic Press (1970) herewith incorporated by reference.

When chemical treatment is used to effect the total surface acid value, any of the methods known in the prior art to be effective in neutralizing either an acidic or basic site can be used. When the support material to be treated is acidic and it is desired to reduce the acidity, then, the reduction can be accomplished by direct reaction with a chemical compound which will either neutralize an acid site or otherwise convert the same to a less acidic site. Such treatments include direct reaction with basic materials such as the metal and ammonium hydroxides, basic amines, alcohols and the like. On the other hand, when the support material to be treated in basic the adjustment in surface acidity can be accomplished by direct reaction with a mineral acid, an organic acid, an amide or the like. In either case, however, care should be exercised so as to select a reagent or mixture of reagents which will form a relatively stable reaction product; i.e., a product which will not be converted back to a basic or acidic site at the conditions at which the oxidation catalyst is used, and to select a reagent which does not form a material or product which will interfere with the catalytic activity of the oxidation catalyst.

The catalysts are comprised of a composite of the refractory support material, or carrier, and one or more Group VIII metals, preferably platinum and more preferably platinum in admixture with rhodium, iridium, palladium, ruthenium and the like. The Group VIII noble metal, or metals, can also be admixed with other metal components known to exhibit, or promote oxidation stability. In a preferred embodiment the metal, or metals, component is composited or intimately associated with the support or carrier by various techniques known to the art. For example, the catalyst composite can be formed by adding together suitable reagents such as ammonium hydroxide or ammonium carbonate, and a salt of alumina such as aluminum chloride or aluminum sulfate to form aluminum hydroxide. The aluminum hydroxide containing the salts of platinum can then be heated, dried, acidified, formed into pellets or extruded, and then calcined in nitrogen or other inert atmosphere. The metal component, or components, is generally deposited on a previously pilled, pelleted, beaded, extruded, or sieved particulate acidified support material by the impregnation method. Pursuant to the impregnation method, a porous refractory inorganic oxide in dry or solvated state is contacted with a metal or metals-containing solution, or solutions, preferably an aqueous solution, or solutions, and thereby impregnated by a technique embodying absorption from a dilute or concentrated solution, or solutions, with subsequent evaporation to effect total uptake of liquid, or an "incipient wetness" technique which requires a minimum of solution so that the total solution is absorbed, initially or after some evaporation.

The Group VIII noble metal component is deposited on the support, or carrier, within the range of from about 0.01 to about 0.3 percent, preferably from about 0.01 to about 0.05 percent, based on the total weight of the catalyst. Greater amounts of metal can be incorporated on the monolith type of support, i.e., up to about 0.3 percent, whereas generally no more than about 0.05 percent of the metal is supported on beads and other forms of support. In compositing the Group VIII noble metals with the carrier, essentially any soluble compound can be used, but a soluble compound which can be easily subjected to thermal decomposition is preferred, e.g., inorganic salts such as halide, nitrate, inorganic complex compounds, or organic salts such as the complex salt of acetylacetone, amine salt, and the like. Where the Group VIII noble metal is platinum, platinum chloride, platinum nitrate, chloroplatinic acid, ammonium chloroplatinate, potassium chloroplatinate, platinum polyamine, platinum acetylacetonate, and the like, are preferably used.

The impregnation solution of the noble metal compound is prepared by dissolving the compounds in water or any other inorganic or organic solvent. The concentration of the metallic component in the solution can range from about 0.01 to 2 percent, preferably from about 0.05 to 1 percent, based on the weight of solution. The impregnation of the noble metal, or metals, component and into a carrier is carried out by impregnating the carrier with the solution, or solutions of the respective metal compounds by various techniques known in the art. The amount of impregnation solution used should be sufficient to immerse the support, or carrier, the precise volume of the solution depending on the metal concentration in the impregnation solution. The impregnation treatment can be carried out under a wide range of conditions including ambient or elevated temperatures and atmospheric or supratmospheric pressures. The noble metal, or metals, component can be dispersed on the carrier by such impregnation methods as the simultaneous impregnation of two or more metals using the same impregnation solution, or by sequential impregnation of the metals components. After impregnation the catalyst is dried by heating at a temperature ranging above about 80° C., preferably between about 80° C. and 150° C. in the presence of nitrogen or oxygen, or both, in an air stream, and the catalyst then calcined at a temperature between about 150° C. to 800° C., preferably about 400° C. to 700° C., in the presence of oxygen in an air stream. In the calcination, the metal components are converted to an active oxide form.

In a preferred embodiment of the present invention, the automotive exhaust support is one comprised of alumina, the total surface acidity which is controlled by treating with a silicon containing precursor compound. Suitably, the deposition is accomplished by first depositing a silicon compound on the base support material from solution and thereafter drying to remove solvent. The silicon compound is then converted to silica by calcining in an oxygen atmosphere. After the surface treatment has been completed, if the surface acidity has changed, or is not within the range desired, then the silica coating procedure can be repeated until such time as the surface acidity is within the desired range. At this point, the noble metal is then impregnated on the acidified support. The active, catalyst component is comprised of a platinum metal, preferably platinum metal admixed with rhodium, palladium or rhenium. In the formation of the catalyst, the total surface acidity is maintained within a range from about 0.001 to about 0.2 micromoles pyridine/m$^2$, and the surface area of the metals composited thereon ranges from about 1 m$^2$/g to about 50 m$^2$/g.

In general, the noble metal, or admixture thereof, is impregnated on the support from an aqueous solution containing the salt, the metal portion of which is contained therein in concentration within the range from about 0.01 to about 0.70 weight percent, or when mixtures of platinum and one or more other noble metals are used between about 1 and 10 atoms of platinum per atom of the other noble metal, or metals. Suitably, the catalyst is one shaped as an extrudate, sphere, bead, tablet or pellet; the shape of the support to an extent determining the optimum metal, or metals, concentration. Generally, the metal component is deposited on the support, when extrudates are employed, preferably, in concentration ranging from about 0.01 to about 0.1 weight percent, and more preferably from about 0.04 to about 0.07 weight percent; and, when monoliters are employed, the metal components are preferably added in concentration ranging from about 0.10 to about 0.6 weight percent, more preferably from about 0.2 to about 0.4 weight percent.

The invention will be more fully understood by reference to the following non-limiting demonstrations and examples which present comparative data which illustrate its more salient features. All parts are given in terms of weight unless otherwise specified.

In conducting the tests, a series of automotive catalysts of various types were prepared and contacted with a gas under conditions which simulate use of the catalyst in treating an exhaust gas generated at typical operating conditions encountered in the operation of an automobile in a steady state cruise at 64 kilometers per hour. The prepared catalysts, standardized at 13 cc charges, were charged to a reactor and heated to reaction temperature under flowing nitrogen. At a temperature of 100° C., steam was introduced and when the catalyst reached the desired operating conditions, a dry simulated raw exhaust gas mixture was added to the wet nitrogen in the proper ratio to stimulate a raw exhaust gas. Tests were conducted at 538° C., 60,000 V/Hr/V, and 75 inches H$_2$O pressure which enabled instrument sampling of the product gas downstream of the reactor. Measurements of the product gas were taken continuously over a two day test period and analyzed for CO, HC, and SO$_2$. The conversions are given as average values over the test period after the catalyst had reached steady state operation. Feed gas components in terms of concentration, and at conditions which approximate operation of an automobile in a steady state cruise at these conditions by the various catalysts appeared primarily related to the type of support that was used in the formation of the catalyst, and that variations in the metal composition played only a secondary effect on the oxidation of SO$_2$, CO and HC. It was then hypothesized that certain modifications of the base might make it possible to minimize the rate of oxidation of SO$_2$ without significantly minimizing the rate of oxidation of the CO and HC.

DEMONSTRATION

To test this hypothesis under more controlled conditions, supports were obtained from commercial catalyst manufacturers D, A and F. Various physical properties were then determined, and the supports were then impregnated with a selected level of a known effective combination of noble metals, deposited from aqueous solution. The impregnated supports were then dried and calcined under controlled similar conditions. Each catalyst was then analyzed for the determination of various other physical properties, and each was then employed in a series of conversion tests with the results given in Table II.

TABLE II

PHYSICAL PROPERTIES OF CATALYST SUPPORTS[1] USED IN CATALYST FORMATION AND RELATIONSHIP BETWEEN CATALYST CONVERSION AND PHYSICAL PROPERTIES

| Type Support & Manufacturer | Noble Metals | Weight Percent Composition Pt | Weight Percent Composition Rh | Average Pore Radius (Angstroms) | Total Pore Volume (cc/g) | B.E.T. Surface Area (m$^2$/g) | Bulk Density g/cc | Total Acidity ($\mu$ Moles/g) | Surface Acidity of Support ($\mu$ Moles/m$^2$) | % Conversion SO$_2$ | % Conversion CO | % Conversion HC |
|---|---|---|---|---|---|---|---|---|---|---|---|---|
| Bead D | PtRh | 0.279 | 0.021 | 105.0 | 0.393 | 92.9 | 0.661 | 25 | 0.280 | 61 | 96 | 78 |
| Extrudates A | PtRh | 0.279 | 0.021 | 56.6 | 0.552 | 202.4 | 0.644 | 49 | 0.316 | 59 | 98 | 99 |
| Extrudates F(1) | Pt-Rh | 0.279 | 0.021 | 65.5 | 0.617 | 200.8 | 0.603 | 63 | 0.374 | 75 | 96 | 83 |
| Extrudates F(2) | Pt-Rh | 0.279 | 0.021 | 82.7 | 0.754 | 189.9 | 0.608 | 67 | 0.448 | 85 | 97 | 93 |
| Extrudates F(3) | Pt-Rh | 0.279 | 0.021 | 122.4 | 0.742 | 133.1 | 0.55 | 54 | 0.421 | 85 | 97 | 94 |
| Extrudates F(4) | Pt-Rh | 0.279 | 0.021 | 124.3 | 0.779 | 162.0 | 0.569 | 51 | 0.333 | 85 | 97 | 94 |

[1] Supports F(1), F(2), F(3) and F(4) are four different supports which are produced by the same manufacturer, F.

of 64 kilometers per hour are given in the following Table I.

TABLE I

| Feed Gas Components (Pollutants) | |
|---|---|
| Component | Concentration (ppm) |
| CO | 11,000–12,000 |
| HC | 170–180 |
| SO$_2$ | 20 |
| O$_2$ | 30,000 |

Examination, and testing of numerous specimens of automotive catalysts used commercially by major manufacturers in this country has shown that at these conditions of operation the percent conversion of SO$_2$ to SO$_3$ ranges from about 45 percent to about 85 percent, or more typically from about 50 or 55 percent to about 85 percent, eighty five percent conversion apparently representing a thermodynamic limitation on the oxidation of SO$_2$ at these conditions. Typically also, at these same conditions, the conversion levels of CO ranges from about 90 to about 99 percent, or more typically from about 95 to about 98 percent, whereas the conversion levels of HC ranges from about 65 to about 99 percent, or more typically from about 75 to about 95 percent. In making statistical studies of the physical properties of a wide range of available catalysts it was perceived that the extent of emission of the various pollutants emitted These data correlate generally with those obtained by direct study of the various manufacturers finished catalysts. The data thus show that only the acidity of the support appears to have any correlation with the levels of conversion obtained, and that this may indeed be the primary variable affecting the level of conversion of SO$_2$ to SO$_3$. Conversely, in this regard acidity appears to have little effect, if any, on the oxidation of CO and HC which, if true, would indeed offer a chance of minimizing sulfuric acid formation without significant adverse effect on suppressing the oxidation of CO and HC. Taking 85 percent SO$_2$ oxidation as the maximum conversion possible imposed by thermodynamic limitations one may thus predict a precipitous drop, or rapid decrease in SO$_2$ oxidation below a total surface acidity of about 0.35.

EXAMPLE 1

Catalyst supports obtained from Manufacturers A and D, as well as Manufacturer G, were then chemically treated to change the physical or chemical properties, or both, of the surface of the catalyst supports and thereby change the catalytic properties of the finished catalysts made therefrom in an attempt to determine if SO$_2$ oxidation can be decreased without excessive loss of conversion of the CO and HC. The results are given in Table III.

TABLE III

PERFORMANCE VERSUS VARIOUS CHEMICAL TREATMENTS

| Type Support & Manufacturer | Treated With | Treatment Level (Wt. %) | Noble Metals | % Conversion $SO_2$ | CO | HC |
|---|---|---|---|---|---|---|
| Beads D | None | — | Pt-Rh | 61 | 96 | 78 |
| Beads D | $TiO_2$ | 2.3 | Pt-Rh | 51.6 | 95.4 | 64.9 |
| Beads D | $TiO_2$ | 2.3 | Pt | 45.9 | 94.9 | 68.5 |
| Beads D | $TiO_2$ | 2.3 | Pt-Pd | 63.5 | 94.7 | 61.1 |
| Beads D | Rare-Earth $O_2$ | 1.8 | Pt-Rh | 40.0 | 94.0 | 63.5 |
| Beads D | (1:1, La:Ce) | 1.8 | Pt | 58.7 | 96.0 | 69.9 |
| Beads D |  | 1.8 | Pt-Pd | 69.5 | 96.4 | 46.9 |
| Beads D | $SiO_2$ | 8.6 | Pt-Rh | 5.9 | 84.8 | 47.8 |
| Beads D | $SiO_2$ | 8.6 | Pt | 14.4 | 84.4 | 52.8 |
| Beads D | $SiO_2$ | 8.6 | Pt-Pd | 12.5 | 80.3 | 19.1 |
| Beads D | Li | 29μ moles/g | Pt-Rh | 51.2 | 94.9 | 71.1 |
| Beads D | Li | 29μ moles/g | Pt | 56.7 | 96.4 | 72.8 |
| Beads D | $La_2O_3$ | 2.3 | Pt-Rh | 60.7 | 97.5 | 73.2 |
| Beads D | $La_2O_3$ | 2.3 | Pt | 57.9 | 97.4 | 76.8 |
| Beads G | None | — | Pt-Rh | 61.4 | 96.3 | 75.7 |
| Beads G | Li | 71μ moles/g | Pt-Rh | 55.1 | 94.7 | 68.9 |
| Beads G | Li | 71μ moles/g | Pt | 58.3 | 94.7 | 73.2 |
| Extrudates A | None | — | Rt-Rh | 59.0 | 98.0 | 99.0 |
| Extrudates A | $SiO_2$ | 13.1 | Pt-Rh | 42.4 | 95.1 | 65.2 |
| Extrudates A | $SiO_2$ | 13.1 | Pt | 50.0 | 96.1 | 72.0 |
| Extrudates A | $SiO_2$ | 13.1 | Pt-Pd | 62.2 | 96.1 | 42.5 |
| Extrudates A | Li | 65μ moles/g | Pt-Rh | 63.7 | 95.8 | 79.8 |
| Extrudates A | Li | 65μ moles/g | Pt | 67.2 | 96.5 | 82.6 |

These data clearly illustrate that certain of the treatments with chemical agents were effective in reducing the percent conversion of $SO_2$ to $SO_3$, though CO and HC, particularly the latter, were also reduced to some extent.

EXAMPLE 2

In further tests selected platinum catalysts designated Extrudates A and Beads D in the foregoing were subjected to chemisorption and pyridine chemisorption measurements to determine the metal surface area and the surface acidity of these catalysts, as given in Table IV.

TABLE IV

Chemical Properties of Chemically Treated Catalyst Supports

| Type Support & Manufacturer | Treatment | Metal Surface Area of Pt Catalyst ($m^2$/gm of Metal) | Surface Acidity of Support (μ Moles/$m^2$) |
|---|---|---|---|
| Beads D | None | 183.8 | 0.280 |
| Beads D | $SiO_2$ | 16.0 | 0.080 |
| Beads D | $TiO_2$ | 137.7 | 0.266 |
| Beads D | Rare-Earth $O_2$ | 214.7 | 0.348 |
| Beads D | $La_2O_3$ | 209.9 | 0.221 |
| Extrudates A | None | 172.9 | 0.316 |
| Extrudates A | $SiO_2$ | 82.4 | 0.110 |

These data, and that presented in Example 1, were then subjected to statistical variable pair analysis via a linear least squares regression, presented in Table V.

The results show that surface acidity is a major controlling variable in determining the dispersion of the catalytically active metal, or metals, that metal dispersion is a major controlling variable for the extent of oxidation of sulfur dioxide and carbon monoxide, and that the combination of metal dispersion and catalyst pore volume is a controlling variable for the extent of oxidation of hydrocarbons.

The extent of oxidation of all three components, $SO_2$, CO and HC, as shown by the analysis, can be decreased by decreasing the metal dispersion, and surface acidity can be controlled to provide the desired metal dispersion.

TABLE V

CORRELATION COEFFICIENTS FOR EXPERIMENTAL VARIABLES BASED ON LINER LEAST SQUARES REGRESSION[1]

| Ordinate (Y) Abscissa (X) | Metal Surface Area | $SO_2$ Conversion | CO Conversion | HC Conversion |
|---|---|---|---|---|
| Surface Acidity | 0.8654 (98) | 0.7421 (90) | 0.6511 | 0.6083 |
| Log [Surface Acidity X 100] | 0.9074 (99) | 0.8056 (95) | 0.7244 (90) | 0.6019 |
| Metal Surface Area | — | 0.8866 (99) | 0.8140 (95) | 0.6107 |
| Log [Metal Surface Area] | — | 0.9589 (99.9) | 0.9428 (99) | 0.6912 (90) |
| Catalyst Pore Volume | — | 0.4020 | 0.3835 | 0.8477 (98) |
| Product of Catalyst Pore Volume and Log [Metal Surface Area] | — | 0.7405 (90) | 0.7117 (90) | 0.9612 (99.9) |

[1]Confidence limits are values in parentheses after the correlation coefficient. Where no limits are given, the variable is well below 90 and well outside the range regarded as controlling.

The attached figure shows, based on these and other statistical data, a plot of the relative extent of hydrocarbon oxidation plotted versus the relative extent of sulfur dioxide oxidation for a wide spectrum of catalyst formulations. The data indicate an interdependence between the two substrates and shows the combination of properties required for the production of a more selective catalyst, i.e., one which suppresses oxidation of sulfur dioxide, albeit it may be somewhat less active in the oxidation of carbon monoxide and hydrocarbons.

The example thus demonstrate the means of changing the placement of the catalyst within this correlation band which will permit, in contrast to prior art catalysts, a more selective catalyst achieved in large part by higher agglomeration of the metal, or metals.

It will be apparent that some modification may be made without departing the spirit and scope of the invention.

Having described the invention what is claimed is:

1. In a process for the preparation of an automotive emission control catalyst comprising a dried, calcined composite of one or more Group VIII noble metals and an inorganic oxide support useful for contacting the fume from a combusting sulfur containing gasoline for oxidation of the sulfur dioxide, carbon monoxide and hydrocarbons contained therein, the improvement which comprises maintaining the surface acidity of said support at from about 0.001 to about 0.2 micromoles pyridine/$m^2$ while contacting and impregnating said support with a solution which contains a compound of said noble metal, or metals, prior to drying and calcining said catalyst.

2. The process of claim 1 wherein the surface acidity of said support ranges from about 0.01 to about 0.10 micromoles pyridine/$m^2$ during the impregnation.

3. The process of claim 2 wherein the surface acidity of said support ranges from about 0.01 to about 0.05 micromoles pyridine/$m^2$.

4. The process of claim 1 wherein the support is comprised of alumina.

5. The process of claim 1 wherein the noble metal is comprised of platinum.

6. The process of claim 1 wherein the noble metal is comprised of an admixture of platinum with one or more of rhodium, iridium, and palladium.

7. The process of claim 1 wherein the noble metal is contained on the support within a range of from about 0.01 to about 0.3 percent, based on the total weight of the catalyst.

8. The process of claim 1 wherein the noble metal is platinum, and it is deposited on the support within a range of from about 0.01 to about 0.05 percent, based on the total weight of the catalyst.

9. The process of claim 8 wherein the catalyst is comprised of from about 0.01 to about 0.3 percent platinum based on the total weight of the catalyst.

10. The process of claim 8 wherein, prior to the deposition of the platinum with the support, the surface acidity of the support ranges from about 0.001 to about 0.2 micromoles pyridine/$m^2$.

11. The process of claim 1 wherein the surface area of the noble metal on the catalyst formed in the process ranges from about 1 $m^2/g$ to about 50 $m^2/g$.

12. In an automotive emission control catalyst useful for contacting the fume from a combusting sulfur containing gasoline for oxidation of the sulfur dioxide, carbon monoxide and hydrocarbons contained therein, which is comprised of one or more Group VIII noble metals composited with an inorganic oxide support, the improvement wherein the support is one having a surface acidity ranging from about 0.001 to about 0.2 micromoles pryidine/$m^2$, and the surface area of the noble metal component ranges from about 1 $m^2/g$ to about 50 $m^2/g$.

13. The catalyst of claim 12 wherein the surface acidity of said support ranges from about 0.01 to about 0.10 micromoles pyridine/$m^2$.

14. The catalyst of claim 13 wherein the surface acidity of said support ranges from about 0.01 to about 0.05 micromoles pyridine/$m^2$.

15. The catalyst of claim 13 wherein the support is comprised of alumina.

16. The catalyst of claim 13 wherein the Group VIII noble metal is comprised of platinum.

17. The catalyst of claim 13 wherein the Group VIII noble metal is comprised of an admixture of platinum with one or more of rhodium, iridium, and palladium.

18. The catalyst of claim 13 wherein the Group VIII noble metal is contained on the support within a range of from about 0.01 to about 0.3%, based on the total weight of the catalyst.

19. The catalyst of claim 13 wherein the Group VIII noble metal is platinum, and it is deposited on the support in concentration ranging from about 0.01 to about 0.05%, based on the total weight of the catalyst.

20. The catalyst of claim 19 wherein the surface acidity of a support ranges from about 0.01 to about 0.05 micromoles pyridine/$m^2$.

* * * * *